United States Patent
Moser

(10) Patent No.: US 8,621,957 B2
(45) Date of Patent: Jan. 7, 2014

(54) HYBRID DRIVE TRAIN WITH TORSIONAL VIBRATION DAMPER

(75) Inventor: Franz Moser, Hochdorf (DE)

(73) Assignee: Daimler AG, Stuttgart (DE)

(*) Notice: Subject to any disclaimer, the term of this patent is extended or adjusted under 35 U.S.C. 154(b) by 87 days.

(21) Appl. No.: 13/199,663

(22) Filed: Sep. 6, 2011

(65) Prior Publication Data

US 2012/0055283 A1    Mar. 8, 2012

Related U.S. Application Data

(63) Continuation-in-part of application No. PCT/EP2010/001463, filed on Mar. 29, 2010.

(30) Foreign Application Priority Data

Mar. 12, 2009 (DE) .......................... 10 2009 012 485

(51) Int. Cl.
    *F16H 37/06* (2006.01)

(52) U.S. Cl.
    USPC .......................................... 74/661; 74/665 D

(58) Field of Classification Search
    USPC ................................ 74/661, 665 D
    See application file for complete search history.

(56) References Cited

U.S. PATENT DOCUMENTS

| | | | | |
|---|---|---|---|---|
| 1,882,280 A | * | 10/1932 | Griswold | 74/574.2 |
| 2,480,946 A | * | 9/1949 | McDowall et al. | 74/433.5 |
| 6,862,887 B2 | * | 3/2005 | Noreikat et al. | 60/716 |
| 7,360,616 B2 | * | 4/2008 | Schiele | 180/65.265 |
| 7,992,661 B2 | * | 8/2011 | Nomura et al. | 180/65.21 |
| 8,152,682 B2 | * | 4/2012 | Swales et al. | 475/275 |
| 8,256,562 B2 | * | 9/2012 | Robinette et al. | 180/291 |
| 2008/0011529 A1 | * | 1/2008 | Hoher et al. | 180/65.2 |
| 2010/0062899 A1 | * | 3/2010 | Engelmann et al. | 477/86 |
| 2010/0081540 A1 | * | 4/2010 | Krause et al. | 477/3 |
| 2011/0048836 A1 | * | 3/2011 | Robinette et al. | 180/300 |
| 2011/0154944 A1 | * | 6/2011 | Mueller | 74/665 A |

FOREIGN PATENT DOCUMENTS

| | | |
|---|---|---|
| DE | 35 45 857 | 2/1987 |
| DE | 36 09 149 | 10/1987 |
| EP | 1 712 394 | 10/2006 |
| GB | 2 346 351 | 8/2000 |
| WO | WO 2009/146670 | * 10/2009 |

* cited by examiner

*Primary Examiner* — Ha D Ho
(74) *Attorney, Agent, or Firm* — Klaus J. Bach

(57) ABSTRACT

In a hybrid drive train with torsional vibration dampers of a hybrid motor vehicle, including an internal combustion engine, an electric machine, a clutch and a transmission, a first spring damping system is arranged between the internal combustion engine and the electric machine and a second spring damping system is arranged between the electric machine and the transmission, each damping system being provided with an arrangement of springs and a centrifugal pendulum for reducing humming noises in a hybrid drive train in the low speed driving range of the hybrid motor vehicle.

5 Claims, 2 Drawing Sheets

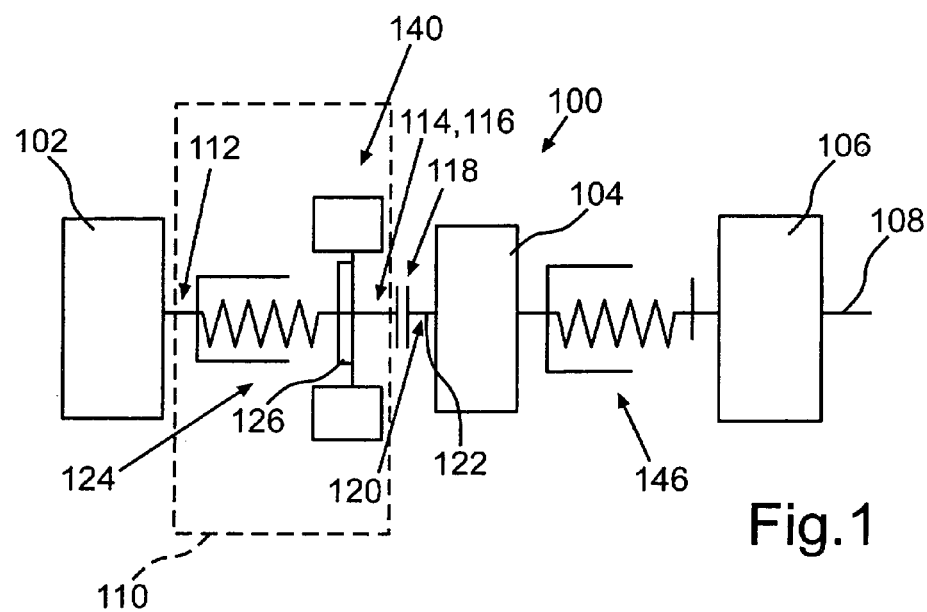
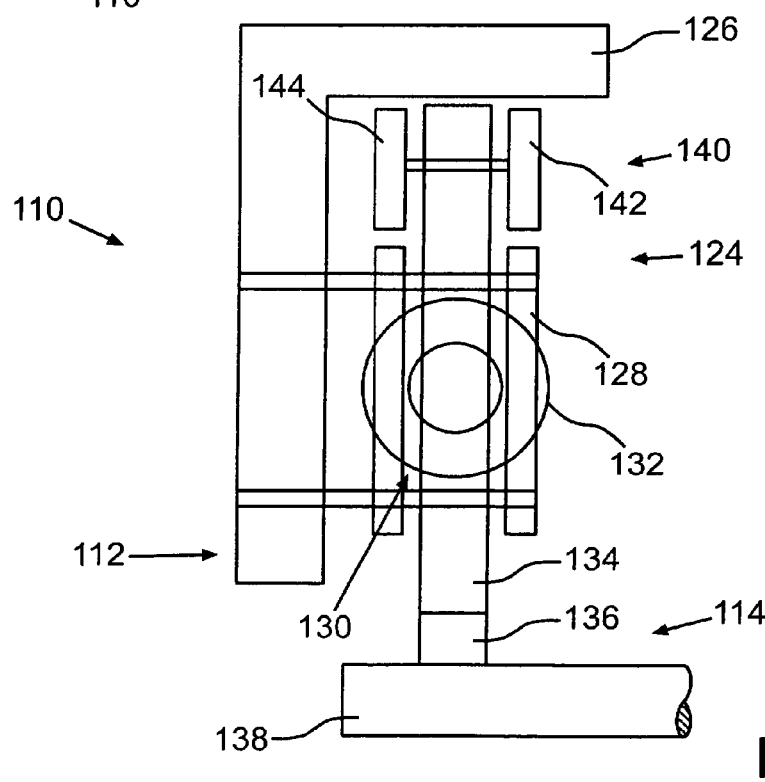

HYBRID DRIVE TRAIN WITH TORSIONAL VIBRATION DAMPER

This is a Continuation-In-Part application of international patent application PCT/EP2010/001463 filed Mar. 9, 2010 and claiming the priority of German patent application 10 2009 012 485.3 filed Mar. 12, 2009.

BACKGROUND OF THE INVENTION

The invention relates to a hybrid drive train including an internal combustion engine, an electric machine and a transmission provided with at least one torsional vibration damper.

In order to reduce torsional vibrations in the drive train of a hybrid drive, in practice one or more torsional vibration dampers (TVD) are used. A typical arrangement consists of one TVD between the engine rotational mass and the electric machine, and a further TVD between the electric machine and the transmission input shaft. This arrangement forms a three-mass vibration system in which the resonance frequency of the electric machine falls within the frequency range which is excited especially by 4-cylinder engines by the main order (second order). This results in disturbing excessive humming noises particularly in the low-speed driving range.

Furthermore, dual mass flywheels with spring and damping systems are known from DE 35 45 857 C1 and DE 36 09 149 C2, in which in the effective direction a resilient mounting arrangement with one or more dampers in the form of slip clutches are arranged in series for connecting a first flywheel element and a second flywheel element.

It has been found however that the operating behavior of drive trains of hybrid drives provided with known flywheels is unsatisfactory.

It is the principal object of the invention to provide means for reducing humming noises in the low-speed driving range in vehicles with a hybrid drive.

SUMMARY OF THE INVENTION

In a hybrid drive train with torsional vibration dampers of a hybrid motor vehicle, including an internal combustion engine, an electric machine, a clutch and a transmission, a first spring damping system is arranged between the internal combustion engine and the electric machine and a second spring damping system is arranged between the electric machine and the transmission, each damping system being provided with an arrangement of springs and a centrifugal pendulum for reducing humming noises in a hybrid drive train in the low speed driving range of the hybrid motor vehicle.

According to a particularly preferred embodiment of the invention, the first spring system and damping system are constructed in the manner of a torsional vibration damper, in particular a dual mass flywheel, with springs on a first radius and the centrifugal pendulum means on a second radius, wherein the second radius is greater than the first radius. With this embodiment, it is the aim to accommodate the centrifugal pendulum means in the existing installation space of a dual mass flywheel such that it has a large effective radius and applies a counter torque to the vibration of the electric machine. This considerably reduces the torsional vibrations which are caused by the resonance of the electric machine, in the lower frequency range.

Preferably, the springs are arranged in the torque flow from the internal combustion engine to the transmission on the internal combustion engine side of the centrifugal pendulum means.

In a preferred embodiment, the centrifugal pendulum means are arranged on a rotational mass.

Also, the clutch is arranged on the transmission side of the centrifugal pendulum means, the input side of the clutch preferably being firmly connected for rotation with an output side of the centrifugal pendulum means.

Preferably, the clutch is a wet clutch.

Also advantageously, the electric machine is arranged on the transmission side of the clutch.

A second spring and damping system is arranged between the electric machine and the transmission.

The advantages of the invention are already apparent in connection with a torsional vibration damper for a motor vehicle hybrid drive, with an input side and an output side, between which a first spring and damping system is arranged, if—as provided for according to one aspect of the invention—the spring and damping system has a centrifugal force pendulum means. This reduces humming noises in the low-speed driving range of a hybrid-drive vehicle. This applies especially in a particularly preferred embodiment of the invention, according to which provision is made for the first spring and damping system to be constructed in the manner of a dual mass flywheel which has springs on a first radius and the centrifugal pendulum means on a second radius, the second radius being greater than the first radius. With regard to the advantages and the operation of the torsional vibration damper, reference is expressly made to the corresponding description of the drive train.

The invention will become more readily apparent from the following description of advantageous embodiments thereof with reference to the accompanying drawings.

BRIEF DESCRIPTION OF THE DRAWINGS

FIG. 1 shows schematically a preferred first embodiment of a drive train according to the invention with a particularly preferred first embodiment of a torsional vibration damper according to the invention, FIG. 2 shows a torsional vibration damper for the drive train of FIG. 1 in a sectional view.

DESCRIPTION OF PARTICULAR EMBODIMENTS

Figure 3:
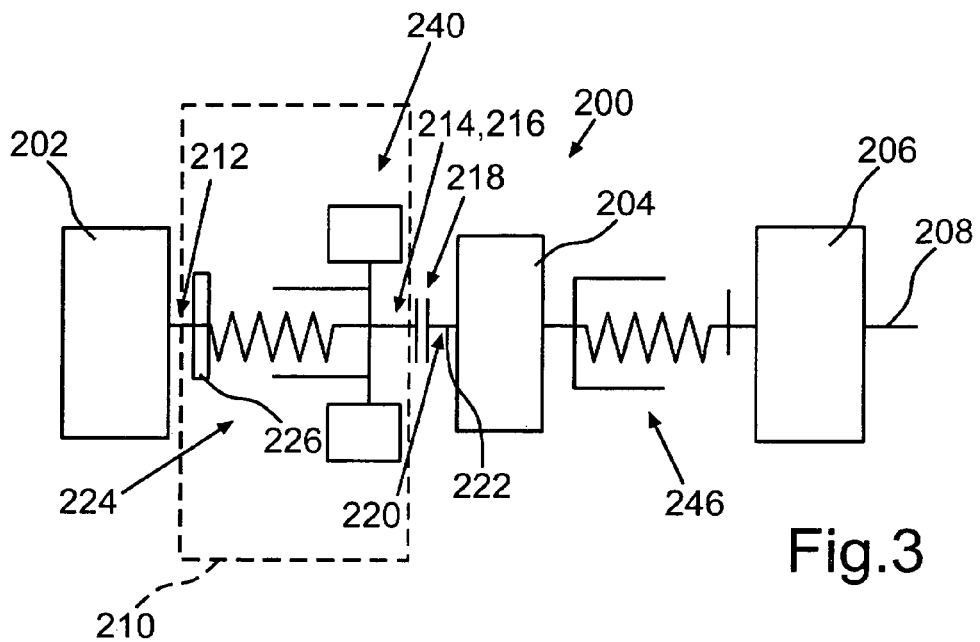
FIG. 3 shows schematically a second embodiment of a drive train according to the invention with a particularly preferred second embodiment of a torsional vibration damper according to the invention.

In the schematic representation shown in FIG. 1 of a particularly preferred first embodiment of a drive train 100 according to the invention, an internal combustion engine 102 and an electric machine 104 are provided in order to drive an output shaft 108 via an automatic transmission 106. The internal combustion engine 102 is preferably a 4-cylinder, 5-cylinder or 6-cylinder spark ignition engine or diesel engine. The electric machine 104 is a unit which permits both motor operation and generator operation. The automatic transmission 106 is a transmission with five, six or seven forward gears. A reverse gear does not need to be provided, since reversing can be provided via the electric machine 104. If the driving takes place via the internal combustion engine 102, this and the electric machine 104 and the automatic transmission 106 represent a three-mass system.

In order to compensate for rotational irregularities of the internal combustion engine 102, a torsional vibration damper 110 is provided. According to a particularly preferred first embodiment of the invention, the input side 112 of the torsional vibration damper 110 is firmly connected for rotation with a crankshaft of the internal combustion engine 102 and the output side 114 is firmly connected for rotation with an input side 116 of a clutch 118. The clutch 118 is a wet clutch. An output side 120 of the clutch 118 is connected in torsion resistant manner to a shaft 122 of the electric machine 104.

The torsional vibration damper 110, which is shown in a simplified sectional view in FIG. 2, comprises a first spring and damping system 124 in the form of a dual mass flywheel, with a first rotational mass 126 being arranged on the input side 112. On this first rotational mass 126 there is supported a cage means 128 with a plurality of cages 130, these cages 130 serving to receive pressure springs 132. On their one side, the pressure springs 132 are supported on the respective cage 130, and with their other side the pressure springs 132 are supported via a central disk 134 and a hub 136 on a shaft 138, the shaft 138 possibly being part of the clutch 118.

The torsional vibration damper 110 further has a centrifugal pendulum arrangement 140, which will be referred to below as a centrifugal pendulum. This centrifugal pendulum 140 has pendulum masses 142, 144 which oscillate in curved paths in a centrifugal field generated during rotation of the vibration damper 110.

It is shown in FIG. 2 that the centrifugal pendulum 140 is arranged radially outside the cage means 128 with the pressure springs 132 in an axially identical position. However, both the centrifugal pendulum 140 and the cage means 128 with the pressure springs 132 are located within the contour determined by the first rotational mass 126 which is for example the flywheel of the engine.

The method of operation of the drive train shown is as follows:

A torque generated by the internal combustion engine 102 with a superposed oscillating torque is first transmitted by the cage means 128 (spring guidance plates), which is fastened to the first rotational mass 126 (flywheel), to the pressure springs 132 of the torsional vibration damper 110 and passed on by the springs 132 to the hub 136 fastened to the shaft 138 to the wet starting clutch 118 (WSC). This hub 136 and the central disk 134 connected thereto are designed such that their external diameter provides for sufficient installation space radially outside the set of springs, for accommodating the centrifugal pendulum 140. This means that the oscillating torque generated by the engine is already considerably reduced by the set of springs, and that the centrifugal pendulum has a maximum effective radius and hence can apply a large counter torque to the oscillating torque which is still present after the torsional vibration damper. Since 136, with the clutch 118 closed, the hub is connected directly to the electric machine 104, the counter torque acts directly on the electric machine 104 and can thus considerably reduce the vibrations caused by the resonance of the electric machine 104.

It is noted that a second spring and damping system 146 is arranged between the electric machine 104 and the transmission 106.

Figure 4:
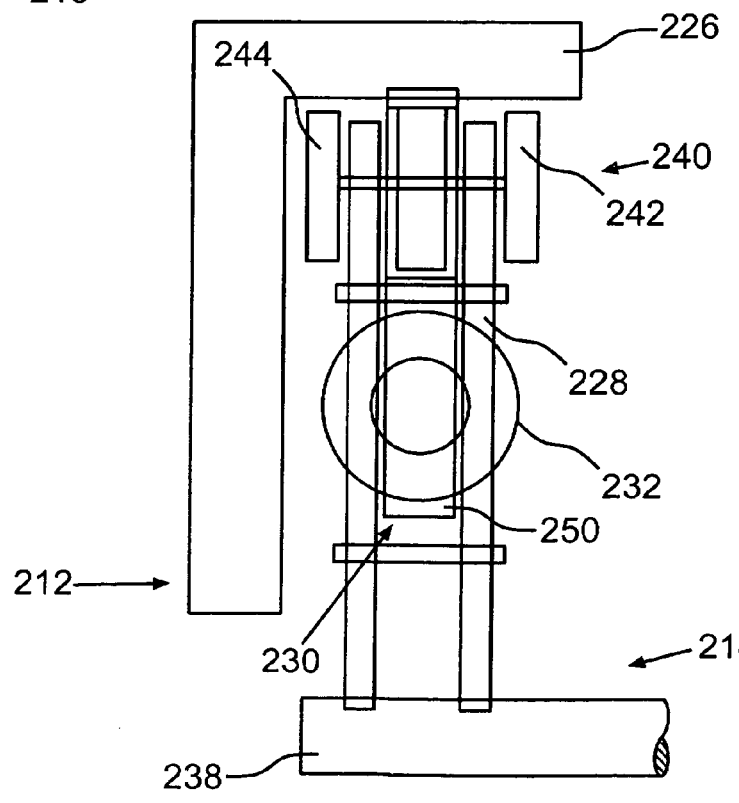
FIG. 4 shows, in a sectional view a torsional vibration damper for the drive train of FIG. 3.

The drive train 200 shown with reference to FIG. 3, according to a second embodiment of the invention, and also the torsional vibration damper 210 provided therein and shown in FIG. 4 according to the second embodiment of the invention, differ from the respective first embodiment only in details. Therefore reference numerals which are increased by 100 compared with the first embodiment in each case are used for the description. Reference is hereby expressly made to the corresponding description.

As in the first embodiment, an internal combustion engine 202 and an electric machine 204 are provided in the drive train 200 shown in FIG. 3, which serve to drive an output shaft 208 via an automatic transmission 206. The internal combustion engine 202 is preferably a 4-cylinder, 5-cylinder or 6-cylinder spark ignition engine or diesel engine. The electric machine 204 is a unit which permits both motor operation and generator operation. The automatic transmission 206 is a transmission with five, six or seven forward gears. A reverse gear does not need to be provided, since reversing can be provided via the electric machine 204. If the driving takes place via the internal combustion engine 202, the engine 202, the electric machine 204 and the automatic transmission 206 represent a three-mass system.

In order to compensate for irregularities in rotation of the internal combustion engine 202, a torsional vibration damper 210 is provided. The input side 212 is firmly connected to a crankshaft of the internal combustion engine 202, and the output side 214 is connected to an input side 216 of a clutch 218. The clutch 218 is a wet clutch. An output side 220 of the clutch 218 is connected to a shaft 222 of the electric machine 204.

The torsional vibration damper 210, which is shown in a simplified sectional view in FIG. 4, comprises a first spring and damping system 224 in the manner of a dual mass flywheel, with a first rotational mass 226 being arranged on the input side 212.

The second embodiment also has a cage means 228 with a plurality of cages 230, these cages 230 serving to receive pressure springs 232. On their one side, the pressure springs 232 are supported on the respective cage 230. Unlike the first embodiment, the springs 232 are however supported with their other side on a central ring 250, this central ring 250 being in operative connection with the first rotational mass 226. Correspondingly, unlike the first embodiment, in the second embodiment the cage means 228 is supported optionally via a hub on a shaft 238, the shaft 238 possibly being formed as part of the clutch 218.

The torsional vibration damper 210 further has a centrifugal pendulum 240. This centrifugal pendulum 240 has pendulum masses 242, 244, which oscillate in curved paths in the centrifugal field. The frequency of the pendulum increases with the rotational speed and can eliminate the irregularity of rotation across the entire speed range.

It is shown in FIG. 4 that the centrifugal pendulum means 240 is arranged radially outside the cage means 228 with the pressure springs 232 being arranged in an axially identical position. However, both the centrifugal pendulum means 240 and the cage means 228 with the pressure springs 232 are located within the contour determined by the first rotational mass 226.

The method of operation of the drive train 200 shown is as follows:

A torque generated by the internal combustion engine 202 with a superposed oscillating torque is first transmitted by the central ring 250, which is fastened to the first rotational mass 226 (to the flywheel), to the pressure springs 232 of the torsional vibration damper 210 and passed on by the springs 232 to the cage means 228 (spring guidance plates) which is fastened to the shaft 238 and to the wet starting clutch (WSC).

This cage means 228 has an external diameter selected so that sufficient installation space is present radially outside the set of springs to fasten the centrifugal pendulum 240 to the cage means 228. Since the cage means 228, when the clutch 218 (WSC) is closed, is connected directly to the electric machine 204, the counter torque acts directly on the electric machine 204 and can thus considerably reduce the vibrations caused by the resonance of the electric machine 204.

It is noted that a second spring and damping system 246 is arranged between the electric machine 204 and the transmission 206.

| Listing of reference numerals | |
|---|---|
| 100 | drive train |
| 102 | internal combustion engine |
| 104 | electric machine |
| 106 | automatic transmission |
| 108 | output shaft |
| 110 | torsional vibration damper (TVD) |
| 112 | input side (TVD) |
| 114 | output side (TVD) |
| 116 | input side (clutch) |
| 118 | clutch |
| 120 | output side (clutch) |
| 122 | shaft (electric machine) |
| 124 | spring and damping system |
| 126 | first rotational mass |
| 128 | cage means |
| 130 | cages |
| 132 | pressure springs |
| 134 | central disk |
| 136 | hub |
| 138 | shaft |
| 140 | centrifugal pendulum means |
| 142 | pendulum mass |
| 144 | pendulum mass |
| 146 | second spring and damping system |
| 200 | drive train |
| 202 | internal combustion engine |
| 204 | electric machine |
| 206 | automatic transmission |
| 208 | output shaft |
| 210 | torsional vibration damper (TVD) |
| 212 | input side (TVD) |
| 214 | output side (TVD) |
| 216 | input side (clutch) |
| 218 | clutch |
| 220 | output side (clutch) |
| 222 | shaft (electric machine) |
| 224 | spring and damping system |
| 226 | first rotational mass |
| 228 | cage means |
| 230 | cages |
| 232 | pressure springs |
| 238 | shaft |

-continued

| Listing of reference numerals | |
|---|---|
| 240 | centrifugal pendulum means |
| 242 | pendulum mass |
| 244 | pendulum mass |
| 245 | second spring and damping system |
| 250 | central ring |

What is claimed is:

1. A drive train for hybrid drives, including an internal combustion engine (102; 202), an electric machine (104; 204) connected to the internal combustion engine via a clutch (118; 218) and a transmission (106; 206) connected to the electric machine (104; 204), with a first spring and damping system (124; 224) being arranged between the internal combustion engine (102; 202) and the clutch (118, 218), the electric machine (104; 204) being arranged on the transmission side of the clutch (118; 218) and the clutch (218) being arranged between the electric machine (104; 204) and the first spring and damping system (124, 224), the clutch (118, 218) having an input side (116, 216) which is firmly connected for rotation with an output side of the spring and damping system (124, 224), the spring and damping system (124; 224) including a centrifugal pendulum means (140; 240) for reducing rotational vibrations between the internal combustion engine and the electric machine (104, 204), and a second spring and damping system (146; 246) being arranged between the electric machine (104, 204) and the transmission (106, 206) for reducing or eliminating rotational vibrations present between the electric machine and the transmission (106, 206).

2. The hybrid drive train as claimed in claim 1, wherein the first spring and damping system (124; 224) is in the form of a torsional vibration damper (110; 210) including a dual mass flywheel and springs (132; 232) arranged on a first radius, and the centrifugal pendulum means (140; 240) being arranged on a second radius, the second radius being greater than the first radius.

3. The drive train as claimed in claim 2, wherein in the torque flow from the internal combustion engine (102) to the transmission (106), the springs (132) are arranged in a cage (128) formed on the internal combustion engine side of the centrifugal pendulum means (140).

4. The drive train as claimed in claim 1, wherein the centrifugal pendulum means (140; 240) is arranged on a rotational mass (126; 226).

5. The drive train as claimed in claim 1, wherein the clutch (118, 218) is a wet clutch.

* * * * *